US012602641B1

(12) United States Patent
Mehta et al.

(10) Patent No.: US 12,602,641 B1
(45) Date of Patent: Apr. 14, 2026

(54) RULE ENGINE SERVICE PLATFORM

(71) Applicant: Wells Fargo Bank, N.A., San Francisco, CA (US)

(72) Inventors: Chirag Mehta, Brooklyn, NY (US); Prosenjit Nandi, Wood-Ridge, NJ (US); Mayank Desai, Stamford, CT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 296 days.

(21) Appl. No.: 18/162,232

(22) Filed: Jan. 31, 2023

(51) Int. Cl.
*G06Q 10/067* (2023.01)

(52) U.S. Cl.
CPC .................................. *G06Q 10/067* (2013.01)

(58) Field of Classification Search
None
See application file for complete search history.

(56) References Cited

U.S. PATENT DOCUMENTS

| | | | | |
|---|---|---|---|---|
| 8,073,801 B1 * | 12/2011 | von Halle | ............ | G06Q 10/067 |
| | | | | 717/110 |
| 10,521,747 B2 | 12/2019 | Warner et al. | | |
| 11,610,137 B1 * | 3/2023 | Buhler | .................. | G06F 16/212 |
| 2002/0194039 A1 | 12/2002 | Bhaskaran et al. | | |
| 2013/0332241 A1 | 12/2013 | Taylor | | |
| 2020/0120000 A1 * | 4/2020 | Parthasarathy | ......... | H04L 67/10 |

| | | | | |
|---|---|---|---|---|
| 2022/0092508 A1 | 3/2022 | Suthan et al. | | |
| 2023/0297784 A1 * | 9/2023 | Lopez Garcia | ........ | G06N 5/045 |
| 2024/0249299 A1 * | 7/2024 | Cohen | ...................... | G06N 3/09 |

FOREIGN PATENT DOCUMENTS

| | | |
|---|---|---|
| CN | 102193958 A | 9/2011 |
| CN | 103019673 A | 4/2013 |
| CN | 111861096 A | 10/2020 |
| CN | 113988786 A | 1/2022 |
| CN | 114418440 A | 4/2022 |

OTHER PUBLICATIONS

Ntentos, E., Zdun, U., Plakidas, K., Schall, D., Li, F., Meixner, S. (2019). Supporting Architectural Decision Making on Data Management in Microservice Architectures. (Year: 2019).*
Ntentos et al. (Year: 2019).*
Alvarez et al., "Decision-Making Support for Input Data in Business Processes according to Former Instances," Computer Science and Information Systems, vol. 18, No. 3, pp. 835-865, https://doi.org/10.2298/CSIS200522051P (2021).
Rosca et al., "Towards a flexible deployment of business rules," Expert Systems with Applications, vol. 23, pp. 385-394 (2002).

* cited by examiner

*Primary Examiner* — Andrew B Whitaker
(74) *Attorney, Agent, or Firm* — Merchant & Gould P.C.

(57) ABSTRACT

A computer system for a rule engine service platform including one or more processors and non-transitory computer-readable storage media encoding instructions which, when executed by the one or more processors, causes the computer system to create a rule engine programmed to receive a business rule and generate a decision model modeling the business rule using decision model and notation; a decision service programmed to implement the decision model; and an administration and configuration service programmed to operate the rule engine.

3 Claims, 5 Drawing Sheets

300

RULE ENGINE SERVICE PLATFORM

BACKGROUND

Business rules provide actionable descriptions of the operations, definitions, and constraints that guide an organization. They are often intended to influence or apply a structure to the activities and behavior of a business. As the world becomes increasingly digital, business rules are often integrated with applications to facilitate their implementation.

SUMMARY

Examples provided herein are directed to a computer system for a rule engine service platform including one or more processors and non-transitory computer-readable storage media encoding instructions which, when executed by the one or more processors, causes the computer system to create a rule engine programmed to receive a business rule and generate a decision model modeling the business rule using decision model and notation; a decision service programmed to implement the decision model; and an administration and configuration service programmed to operate the rule engine. In some examples, the decision model is written in Friendly Enough Expression Language.

In other examples, the decision model includes micro rules. In further examples, the administration and configuration service is further programmed to combine two or more of the micro rules to generate a new decision model. In other examples, the administration and configuration service is further programmed to test the decision model in one or more use case scenarios. In still other examples, the decision service is a microservice.

Examples provided herein are further directed to a method for modeling a business rule on a business rule service platform. The method includes identifying the business rule; defining the business rule as a decision model using decision model and notation; and inserting the decision model. In other examples provides herein, the business rule is identified according to a business or regulatory need.

In other examples provided herein, the method further includes defining the business rule using the decision model and notation comprises defining one or more micro rules. In still other examples provided herein, the method further includes running the decision model in response to a request to validate from a user.

In yet other examples provided herein, the method further includes running the decision model in response to a submission by a user. In further examples provided herein, the method further includes requesting a credential from the user. In other examples provided herein, the decision model comprises one or more Friendly Enough Expression Language expressions.

In other examples provided herein, the method further includes identifying an update to the business rule; defining the update using the decision model and notation; and inserting the update in the decision model to generate a new version of the decision model. In further examples provided herein, the method further includes versioning the decision model and the new version of the decision model, such that both the decision model and the new version are maintained. In still further examples provided herein, the method further includes applying a first permission to the decision model and a second permission to the new version of the decision model, wherein the first permission and the second permission are different permissions. In yet further examples provided herein, the first permission and second permission each relates to accessing the new version of the decision model. In other further examples provided herein, the first permission and second permission each relate to viewing the new version of the decision model.

In other examples provided herein, the method further includes providing the decision model to one or more applications as a decision service.

Examples provided herein are further directed to a computer system for a rule engine service platform, including one or more processors; and non-transitory computer-readable storage media encoding instructions which, when executed by the one or more processors, causes the computer system to identify a business rule; define the business rule as a decision model using decision model and notation; and insert the decision model.

The details of one or more techniques are set forth in the accompanying drawings and the description below. Other features, objects, and advantages of these techniques will be apparent from the description, drawings, and claims.

DETAILED DESCRIPTION

Figure 1:
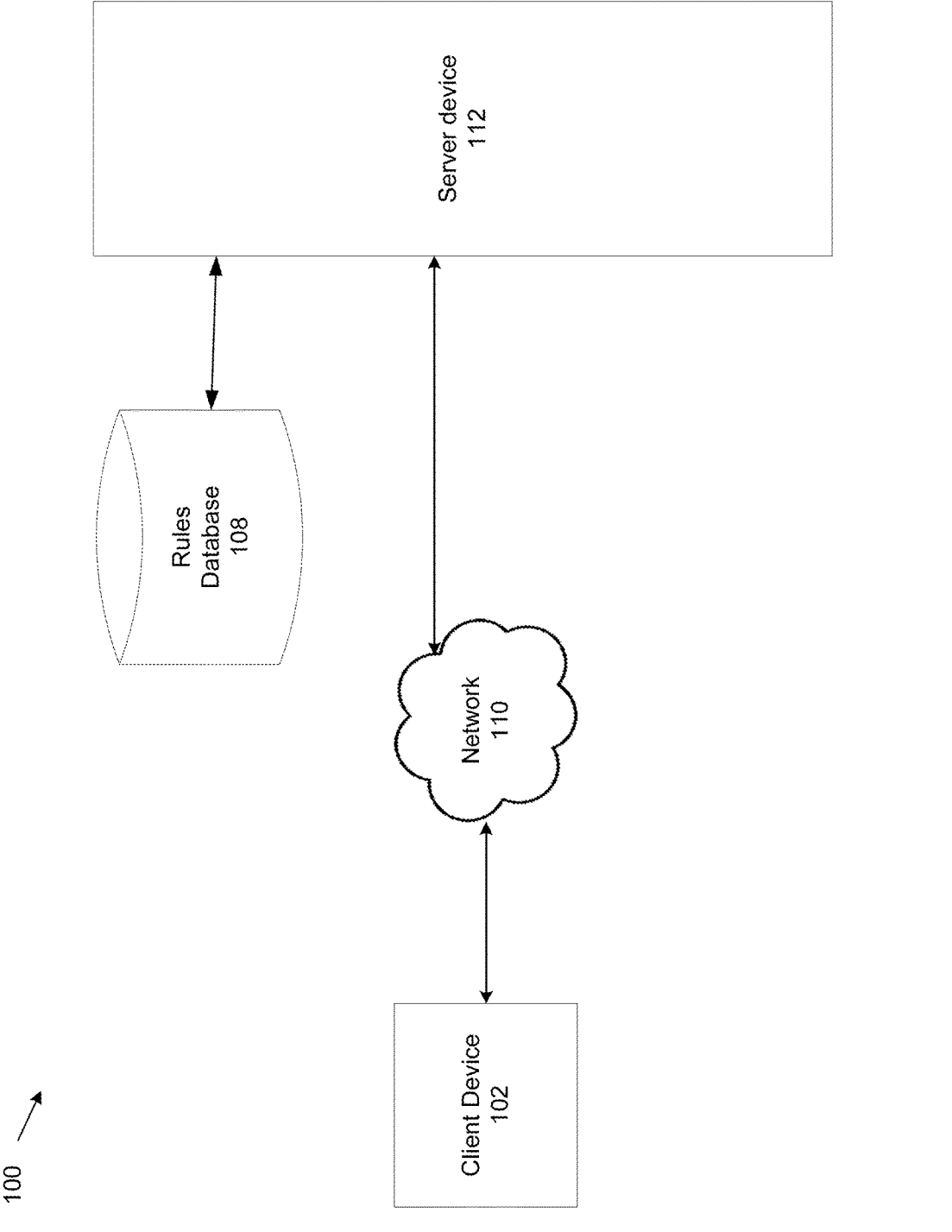
FIG. 1 shows an example system for implementing a rule engine service platform.

This disclosure relates to a rule engine service platform. The example rule engine service platform, as disclosed herein, can provide a centralized location for the maintenance of business rules and associated logic. Use of a centralized platform enables the implementation of a standard pattern of modeling that simplifies the creation and maintenance of business rules.

Conventional approaches to managing business rules typically rely upon text-based requirements. Rules harvesting is conducted by reviewing policies and documents and interviewing subject matter experts. Rules are then published as documents. These documents are interpreted by technology for translation into a rule language and software code that may be implemented in an application. These rules are hard coded into each application and usually cannot be reused.

The implementation of any business rules and decisions in workflows are tightly aligned with applications due to the increasing digitization of the workplace. These traditional document-based rules are not easily shared or maintainable. Once the rule is coded into the application, it becomes complex to find and understand the rule within the application code, making updates or revisions difficult and ineffective. As a result, changing a business rule or decision requires a long release cycle and full application regression. Further, rules written in different languages or using different formats have no portability and cannot be reused in new systems.

In the examples provided herein, business rules are implemented using decision models that can be readily deployed and directly executed on an automation engine. The examples disclosed herein provide for a central repository of business rules modeled using a standardized model. Rules can be accessed and used by many different applications without the challenges of incorporating the rule into the application code. Rules can be updated once in the central location and then distributed across the relevant applications.

In further examples provided herein, rules may be modeled using decision model and notation (DMN). DMN is a modeling language and notation developed for the precise specification of business decisions and business rules. DMN is easily readable by the different types of people involved in decision management, including executives and management who specify the rules and monitor their application, and business analysts who review the rules.

In further examples provided herein, the rule engine service platform may be a digital platform and provide an interface and infrastructure for the generation, maintenance, and deployment of business rules. The rule engine service platform may incorporate one or more decision models organized to model one or more business rules. The platform may provide one or more interfaces, such that administrators and others who generate rules can interact with the platform according to their needs. The platform may communicate with one or more applications to deploy decision models as decision services to be implemented by the one or more applications.

Figure 2:
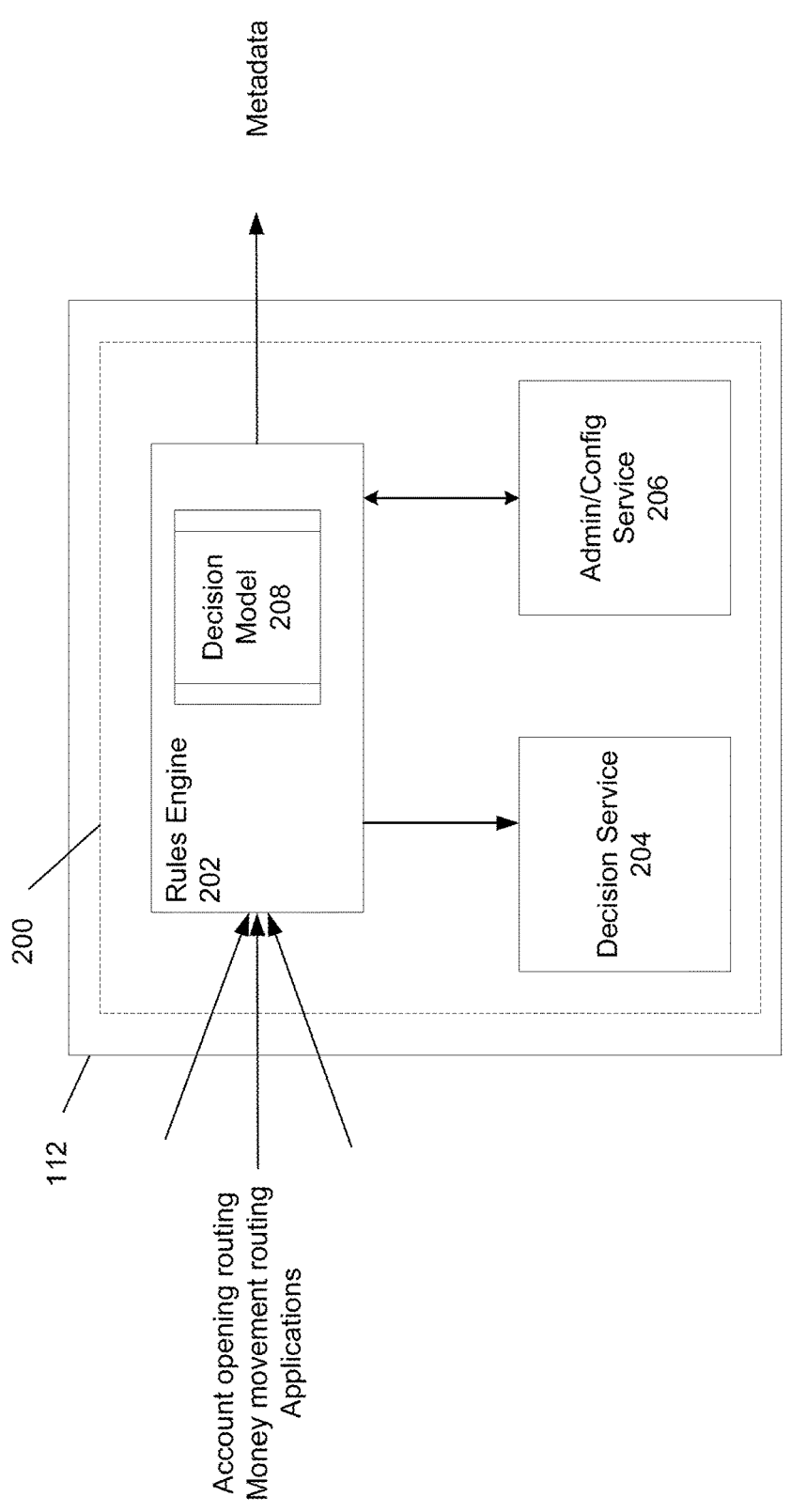
FIG. 2 shows example logical components of a server device of the example system of FIG. 1.

FIG. 1 schematically shows aspects of an example system 100 programmed to generate and operate rule engine service platform 200 (depicted in FIG. 2). System 100 may include client device 102, rules database 108, network 110, and server device 112.

Each of the client and server devices may be implemented as one or more computing devices with at least one processor and memory. Example computing devices include a mobile computer, a desktop computer, a server computer, or other computing device or devices such as a server farm or cloud computing used to generate or receive data.

The client device 102 is programmed to communicate with server 112. Client device 102 may be further programmed to run one or more applications. In some examples, the applications running on client device 102 may communicate with server 112. Client device 102 may request services from server device 112. Requests for services may be commands issued by a user or requests from an application running on client device 102.

Client device 102 provides a user access to programs and services provided by server 112. Client device 102 may provide a particular user, such as the administrator, access to and control of programs and services on server 112 based on credentials associated with the particular user. For example, a particular user, such as an administrator, may request administrative services that enable the administrator to manage a program maintained on server 112. The administrators request for administrative services may only be granted if credentials are provided.

The rules database 108 is programmed to provide storage for rules, rule models, and decision models. Rules database 108 may store rules and decision models as byte chunks, such as using an XML format. In examples, a rule model may be made up of one or more decision models. Decision models may be written and stored using DMN.

The server device 112 is programmed to communicate with client device 102 and rules database 108. Server device 112 is further programmed to run and maintain programs and services. Server device 112 may communicate with rules database 108 to store and retrieve rules, rule models, and decision models. Server device 112 may communicate with client device 102 to provide requested services to client device 102.

The network 110 provides a wired and/or wireless connection between the client device 102, the service device 106, and the server device 112. In some examples, the network 110 can be a local area network, a wide area network, the Internet, or a mixture thereof. Many different communication protocols can be used. Although only two devices are shown, the system 100 can accommodate hundreds, thousands, or more of devices.

The technology described herein results in the technical solution of a centralized rules repository. Rules are stored within the repository as decision models. Decision models can be newly generated and stored, then combined and recombined to model a wide variety of business rules. Through this flexibility, the decision models provide a dynamic and standardized system for modeling business rules.

Among other advantages, the technical improvements in the present disclosure provide a centralized place to maintain business rules and logic. By implementing a standard model and following a standard pattern, the examples of the present disclosure describe a system with simple and straightforward operations for the creation and maintenance of rules. By centralizing and standardizing the modeling of rules, rules can be updated with minimal impact on the actual application while changing rule. The portability of centralized and standardizes rules among different applications eliminates many of the problems associated with platforms transfers or changes. These and other advantages are described further below.

Referring now to FIG. 2, additional details of the server device 112 are shown. In this example, the server device 112 has logical modules that assist with the generation and operation of the rule engine service platform 200. Server device 112 may include rule engine 202, including one or more decision models 208, decision service 204, and administration and configuration service 206.

Rule engine 202 is programmed to generate and maintain models of business rules using decision models 208. Each business rules may be modeled using one or more decision models 208. Decision model 208 may be written using DMN.

Rule engine 202 may be programmed to use decision models 208 to maintain modeled business rules in a modular form. For example, an individual rule may be implemented as one or more "micro rules." Each micro rule may make up a particular sub element or requirement of the overall rule. Each micro rule may include one decision model. This modular format contributes to effective rule maintenance, updating, and deployment. Individual micro rules can be updated as appropriate and deployed to update the overall rule without the necessity to develop the overall rule anew based on a change to one or more micro rules.

Rule engine 202 may be programmed to deploy each new rule cycle or update as a microservice. Microservices are a way of arranging an application as a collection of loosely-coupled services, with each service executing a discrete task. The collection communicates through lightweight protocols, providing adaptability and easy deployment. By running new updates as a new microservice, older version can remain in service without interference. In other examples, older versions can be fully replaced by withdrawing a microservice associated with the older version without disrupting other services or operations of applications implementing the microservice.

In examples, decision model 208 may represent one or more decision models associated with a particular business rule, or decision models of one or more business rules. Once defined, a decision model 208 may be combined with one or more additional decision models, either new or preexisting, to generate new rules. Decision model 208 may represent an individual decision model or a combination of decision models assembled into a rule. A rule may be made up of a single decision model, or a combination of decision models.

Decision models 208 may be written in Friendly Enough Expression Language (FEEL). FEEL may be a desirable language choice is it was created to support DMN. FEEL was developed as a lightweight language with a focus on supporting the creation of expression with the minimum number of data types and grammar. FEEL was developed with the specific intent that it would be effectively used by persons without specific technical training. FEEL expressions may be used to define the logic of a decision in a DMN model. FEEL is designed to facilitate both decision modeling and execution by assigning semantics to the decision model constructs. Thus, use of FEEL in expressing and modeling rules in Decision models 208 can increase accessibility of the rules and system to many types of users.

Rule engine 202 may be configured such that an active decision model 208 is protected from deletion. In examples, particular credentials or validations may be required to delete a rule or to change an active/inactive status of a rule. Rule engine 202 may extract and store metadata associated with generation, usage, and storage of decision models 208. For example, metadata indicating a particular decision model is used in one or more active rules may be stored with the decision model.

Rule engine 202 is programmed to deploy decision service 204 for use by a device or application. Decision service 204 may be deployed as a microservice. Decision service 204 is programmed to implement decision models 208 in applications and devices, such as client device 102.

Decision service 204 executes the decisions modeled in a particular decision model 208 or combination of decision models 208. For example, a particular decision model 208 may indicate that for a form to be accepted it must include both a first and a last name for a person filling out a form. A user may access and fill out the form using an application, such as a browser application. When the form is submitted, a decision service 204 applies the particular decision model 208 to evaluate the contents of the form. The decision service 204 may be requested by the application, such as through an application programming interface call. In response the decision service 204 evaluates the form according to the decision model. If both a first and last name for the person filling out the form are found, the form is accepted. If both a first and last name for the person filling out the form are not found, the form may be rejected or flagged.

Decision service 204 may be configured as a monitored transparent decision service. Decision service 204 may reside on server device 112 as rule engine 202 but is not integrated within the code of rule engine 202. In this configuration, decision service 204 remains independent of rule engine 202 but accesses it to execute rules.

Decision service 204 may be configured as a hosted transparent decision service. For example, decision service 204 may be a ruleset deployed as a web service. It may be installed on the common server device 112 with rule engine 202 and then integrated with rule engine 202.

Administration and configuration service 206 is programmed to provide operative control and oversight of rule engine 202. Administration and configuration service 206 may be deployed using a microservice or a monolithic architecture.

Administration and configuration service 206 may be configured to provide administration access to rule engine 202, such as for uploading new rules or new versions of rules, for changing the active/inactive status of rules, for changing permission associated with accessing or viewing rules, for deleting rules, etc. Access to administration and configuration service 206 may be based on a user's credentials.

Administration and configuration service 206 may be programmed to provide documentation capability. For example, administration and configuration service 206 may maintain a log, or cause rule engine 202 to maintain a log, of rule deployment, rule active/inactive status and associated credentials with the change in status, generate of a new rule or new version of a rule, etc.

Administration and configuration service 206 may be programmed to implement testing of new rules and models and review or display testing results. In examples, testing can be conducted fully within the rule engine service platform 200. For example, testing may be initiated and monitored by administration and configuration service 206, and executed by rule engine 202. Testing may be conducted on a total number of predicted use scenarios. Testing may be conducted on a predetermined number of use scenarios.

Administration and configuration service 206 may be programmed to output a report of testing results. Test results may be documented as a score defined upon a predetermined scale. In examples, micro rules or sub elements of a rule model may be individually scored. Test results may be presented as pass/fail result. For example, tests may be based on scenarios having expected results. The results may be output as pass if the actual results match the expected results. The results may be output as fail if the actual results differ from the expected results.

Administration and configuration service 206 may be configured to analyze a plurality of records simultaneously. In embodiments, administration and configuration service 206 may analyze up to 1000 records at a time.

Administration and configuration service 206 may be programmed to set controlled or permissioned access to one or more rules of rule engine 202. For example, access to the decision model 208 of rule engine 202 may be organized according to groups or other permissions. Not all users may have access to all rules or all portions of rules. For example, an administrator or supervisor may have full access to all rules and micro rules, and may set permission for others according to their roles and needs. Other users may have no direct access to rule engine 202, and only interact directly with applications which may be programmed to call a decision service 204.

Administration and configuration service 206 may be programmed to facilitate and control creation of new rules and decision models. In embodiments, administration and configuration service 206 may be configured such that new rules may be created in a web browser, such as Chrome, Edge, Firefox, etc.

Administration and configuration service 206 may be programmed to facilitate setting of selective visibility of rules or micro rules. In examples, visibility and accessibility of rules may be interrelated. For example, a particular supervisory rule may only be accessible to a user in a particular supervisory role. The rule may accordingly only be visible to a user in the particular supervisory role. The rule may, alternatively, be visible but not accessible to other users not in the supervisory role, and serve as an indication that a particular business rule requires action or approval by the supervisory role so that other users may plan accordingly.

For another example, a rule may be undergoing an update, such that an active first version of the rule and a new and not yet active second version of the rule are both represented on rule engine 202. Both the first and second versions of the rule may be visible to administrators preparing to deploy the second version of the rule. Only the first version of the rule may be visible to users who implement the rule. Alternatively, users who implement the rule may be able to view both the first and second version of the rule, but are only able to access the first version of the rule. In this example, the visibility of the second version of the rule may serve as a notification that an update to the rule is being prepared or is ready be deployed.

As another alternative, both the first and second version of the rule may be both visible and accessible, and a user who implements the rule may determine which version to implement. As yet another alternative, which version to be implemented by be determined by another rule.

Visibility and accessibility of rules, micro rules, and versions of rules can set to automatically adjust at a particular date and/or at a particular time. The launch and deployment of a new version can be planned and communicated well in advance to allow users time to prepare and adjust.

Administration and configuration service 206 may be programmed to set a controlling version of a particular rule. For example, in some cases it may be necessary to maintain two versions of a decision model active at the same time. A newer version, modeling the most recent business rules, and an older version which may need to remain active due to being relevant to certain cases due to a sunset period of phasing out the older version of the rule. The newer version may be set as a controlling version to ensure most cases are properly handled under the decision model of the most up-to-date rules. The older version may remain active but only accessible under predetermined circumstances.

Administration and configuration service 206 may be programmed to support versioning of rules and decision models, to support accurate identification. Administration and configuration service 206 may be configured to support backward compatibility between versions of rules and decision models.

Figure 3:
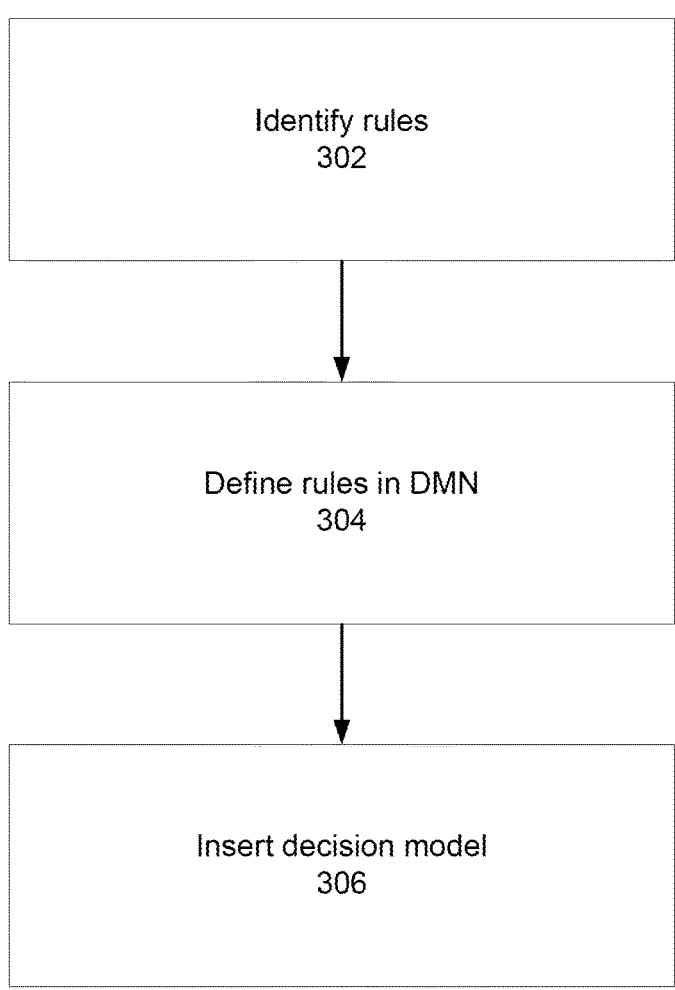
FIG. 3 shows a flowchart of an example method for modeling a rule using the example system of FIG. 1.

Referring now to FIG. 3, an example process 300 is shown for modeling a business rule and deploying the decision model. Process 300 describes modeling of business rules to permit implementation of the business rules by and within an application without requiring the rule, and corresponding code, to fully integrated with the application. Process 300 is described herein in relation to an example rule involving receiving and validating a legal address.

At 302, the rules are identified. Rules may be identified through relevant regulations. Rule may be written and codified by individual organizations according to that organizations needs and preferences. Some rules specific to the legal address example may be that the address must be a physical address, not a post office box. Country specific rules such as the ordering of the street name and the street number may be applicable. Words in the address indicating it is not a living address, such as "office" or "hanger," may not be accepted.

At 304, the rules are defined in DMN. The rules may be defined using FEEL. The rules may be defined by creating a new file or model. Rules may be assembled by combining existing decision models or may require new decision models be written. A rule may be made up of a single decision model or incorporate one or more decision models. For example, each requirement within a rule may be an independent decision model and each may be applied separately as a micro rule. In another embodiment, a decision model addressing whether the address contains a post office box and a decision model addressing country specific rules may be combined into a single compound decision model.

At 306, the DMN decision model is stored by the rule engine. For example, the DMN decision model may be stored in a rules database, such as rules database 108 of FIG. 1. Decision models may be stored individually or organized into more complex rules. In examples, multiple copies of a decision model may be stored. A copy of a particular decision model may be stored individually along with one or more combinations of decision models including the particular decision model. One or more version of a particular decision model may be stored at the same time.

Once active, rules can be directly executed on automation tools. Decision service 204 of FIG. 2 is an example of an automation tool. The decision models may be implemented by a user operation, such as by pressing a "validate" button. For example, the button may call the decision service, or call an application programming interface which in turn requests the decision service from the rule engine. The decision model may be implemented automatically, such as evaluating an entry that has been submitted with the decision model. The rule engine may return a response to the user such as "accepted" if the decision model finds that all rules are complied with, or a report of errors in the submission of a rule has been violated.

For rules requiring particular credential or permissions, running a decision model may include requesting credentials from a user. A decision model may be configured to enable a user to direct a submission to a supervisor or administrator for validation.

Figure 4:
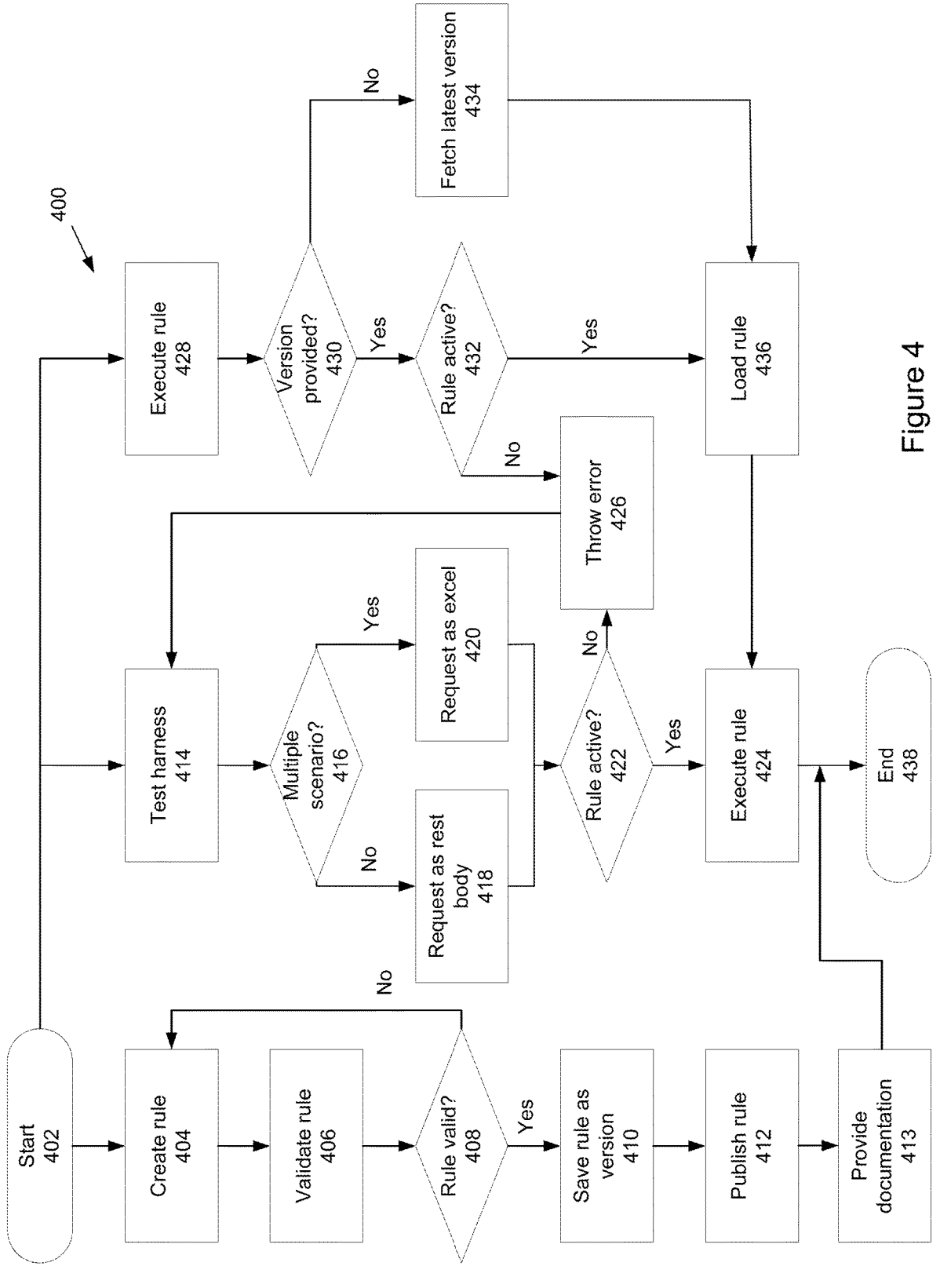
FIG. 4 shows a flowchart of an example decision rule lifecycle for a rule generated by the server device of FIG. 2.

Referring now to FIG. 4, a flowchart of an example decision service rule lifecycle process 400 for a rule generated by the server device of FIG. 2. This process 400 may be performed by a rule engine, such as rule engine 202 of FIG. 2. Process 400 may be executed as a single process or may be executed as two or more processes in parallel.

At 402, a decision service is initiated. The rule engine may initiate one or more decision services in the course of the process 400. For example, a single decision service, such as decision service 204 of FIG. 2, may be initiated to perform the whole or some part of process 400. In another example, two or decision services may be initiated to perform two or more parts of process 400.

At 404, a new rule is created. The rule may be created in a DMN format. The rule may be created within the decision service or may be uploaded or otherwise imported into the decision service. The rule may be made up of one or more micro rules or decision models. The rule may be modular, such that individual or groups of decisions within the rule are created and updatable independent of one another.

At 406, the rule is validated. Validation includes checks of the new rule to ensure effective use and implementation of the rule. Validation may include, for example, checking for syntactical errors. At 408, the results of the validation performed at 406 are evaluated.

If the rule is not valid, the process returns to 404 and the rule is adjusted or a new rule is generated. The rule may be returned with a report indicating reasons the rule was found invalid. The rule may be automatically adjusted by the system based on the reasons for invalidity found, or a technician may manually adjust the rule to correct invalidities.

If the rule is valid, the rule is saved as a new version at 410. If the rule is an entirely new rule, the version may be version zero or version one. The rule may also be an update to an existing rule or micro rule, such that the version may be n+1, wherein "n" is the immediately preceding version of the rule or micro rule.

Individual or groups of micro rules may be versioned separately from the overall rule the micro rules together make up. For example, a particular micro rule may be used in a particular rule. The micro rule may have only been updated once, such that the micro rule is on version two. However, the rule may incorporate other micro rules which have also undergone updates, such that the rule is on a higher version, e.g., three or more. When the micro rule is updated to version two, the rule will also update to a next highest number, which may not be the same version as the micro rule.

At 412, the new version of the rule is published. Publication may be a global publication such that any user accessing a particular rule receives the new version. Publication may be limited based on a user's credentials or set for a particular time or date. Publication may refer to implementing a particular version of the rule, visibility of a particular version of the rule, or both.

At 413, end-to-end-documentation of the rule, or version, may be provided. Documentation may provide a text or graphical representation of the data and logic used by the rule. The documentation may be generated automatically in response to publication of the rule or version. The documentation may be generated in response to a request by an operator or other user. Documentation may be displayed or otherwise accessible to a user. Documentation may be stored along with a rule or may be associated with a rule and stored separately.

Documentation may be text-based, graphic-based, or some combination of text and graphics. Documentation may reflect the definition of the rule, and depict or describe one or more of the decision model, the defined data types to be received and/or generated, decision logic, decision tables. Documentation may include expressions used to define the rule. In embodiments, expressions may be depicted in any language, including natural and/or unstructured language. In embodiments, the decision model may be depicted using decision requirement diagram (DRD) components including one or more decision requirement graphs (DRGs). A DRD or other model/rule depiction may include components such as decision nodes, decision functions, knowledge sources, input data, decision services, and requirement connectors.

For example, a particular example may use customer data for a particular customer to make a determination of whether the particular customer is a premium customer. Documentation for this example may include three parts: a flowchart of the DMN model, a chart of data types, and DRD component definitions.

In embodiments, the flowchart of the model may appear using DRD components. The flow chart of the DMN for this simple example may have only two element: an input data graphic indicating customer data and a decision block indicating an evaluation of whether the customer is premium. An arrow from the input data graphic to the decision block can be used to indicate the customer data is used in the determination.

The chart of data types may break down what is contained within the customer data and/or may preferentially identify data used in the determination. The chart may identify both the content of the particular data and the type of data it represents (e.g., structure, number, etc.) The chart of data types for the present example may appear as below:

CustData (Structure)
age (number)
priors (boolean)

DRD components may define the particular components appearing the DMN flowchart. Table 1 presents an example set of definitions for the present example.

TABLE 1

| U | custData.age (number) | custData.priors (boolean) | Premium (number) |
|---|---|---|---|
| 1 | >21 | true | 300 |
| 2 | >21 | false | 200 |

At 438, the decision service may be retired. Once the rule is published and creation of the rule is complete, the particular decision service may be retired. The same decision service may be initiated for other portions of process 400, for the creation of another new rule or update, or a new decision service may be initiated for each implementation of process 400.

At 414, a test is initiated. The test may be initiated using the same decision service as used for the creation of a rule at 404, or may be a different decision service. The test may be initiated automatically by the rule engine in response to a trigger in the system, e.g., in response to an error indicating an inactive rule. The test may be initiated manually by a technician or other operator. Test scenarios in the rule engine can be used to test a rule, micro rule, or decision service prior to deployment or publication. Testing can be used to ensure proper function of the rules and decision services. Decision services may be tested at any time during rule or model development or implementation.

At 416, a determination is made whether to use a multiple scenario for the test. Test scenarios are used to validate the functionality of rules, rule data, or of DMN models, such as before deploying them into a production environment. Test scenarios may be run at a project level or inside a specific test scenario asset. Test scenarios may be independent and may not affect or modify other test scenarios. If a multiple scenario is not to be used, the single scenario is requested as a rest body at 418. If multiple scenarios are to be used, the multiple scenarios are requested as a spreadsheet at 420.

Whether the scenario is single or multiple, a determination whether the rule is active is made at 422. The determination is based on the results of the scenarios. A test scenario may use data from the rule or model to set given conditions and expected results based on one or more defined business rules. When the scenario runs, the expected results and actual results of the rule instance are compared. If the expected results match the actual results, the test is successful. If the expected results do not match the actual results, then the test fails.

If the rule is not active, such as if the rule fails the test, an error is thrown at 426 for an inactive rule. The process may then return to reinitiate the test or a new test at 414. In embodiments, the error may include an alert to the technician or other operator who may intervene to modify the rule or otherwise correct the error.

If the rule is active, the rule may be executed at 424. The rule may be executed in parallel in or in sequence with a sharing of the test outcome. Execution of the rule may be performed by the same decision service executing the test, or the rule may be saved and executed by another decision service.

In embodiments, testing may further include generating or modifying documentation associated with the tested rule. Documentation, such as the documentation described above in association with 413, may be updated or newly generated to record testing results and/or changes made to the rule in the course of testing or in response to testing outcomes.

At 438, the decision service may be retired. Once the test is complete the particular decision service may be retired. The same decision service may be initiated for other portions of process 400, for the initiation of a new test, or a new decision service may be initiated for each implementation of process 400.

At 428, a rule is executed. The rule may be executed using the same decision service as used for the creation of a rule at 404 and/or to initiate the test at 414, or may be a different decision service. The rule may be executed automatically by the rule engine in response to a trigger in the system, e.g., a submission of a document subject to one or more business rules. The execution of the rule may be initiated manually by a technician or other operator.

At 430, a determination of the version provided is made. In some examples, a particular version may be specified by an operator or administrator. A particular version may be determined based on a particular document being submitted or the request to execute the rule being received from a particular application. A particular version may be determined based on the date and time a request is received. If a version is provided, a determination may be made whether the rule is active, at 432.

If the rule is not active, an error is thrown at 426 for an inactive rule. In response to the error, a test may then be initiated, at 414. If the rule is active, the rule may be loaded at 436.

If no version is provided, the latest version may be fetched at 434. If a particular version is not provided, the system may be configured to default to the most recent version. The rule may then be loaded, at 436. The rule may be loaded in a DMN format.

Once loaded, the rule may be executed at 424. Execution of the rule may involve the application of rules, micro rules, and/or decision models to a document or another process subject to one or more business rules.

At 438, the decision service may be retired. Once the rule is executed the particular decision service may be retired. The same decision service may be initiated for other portions of process 400, for the execution of another rule, or a new decision service may be initiated for each implementation of process 400.

Figure 5:
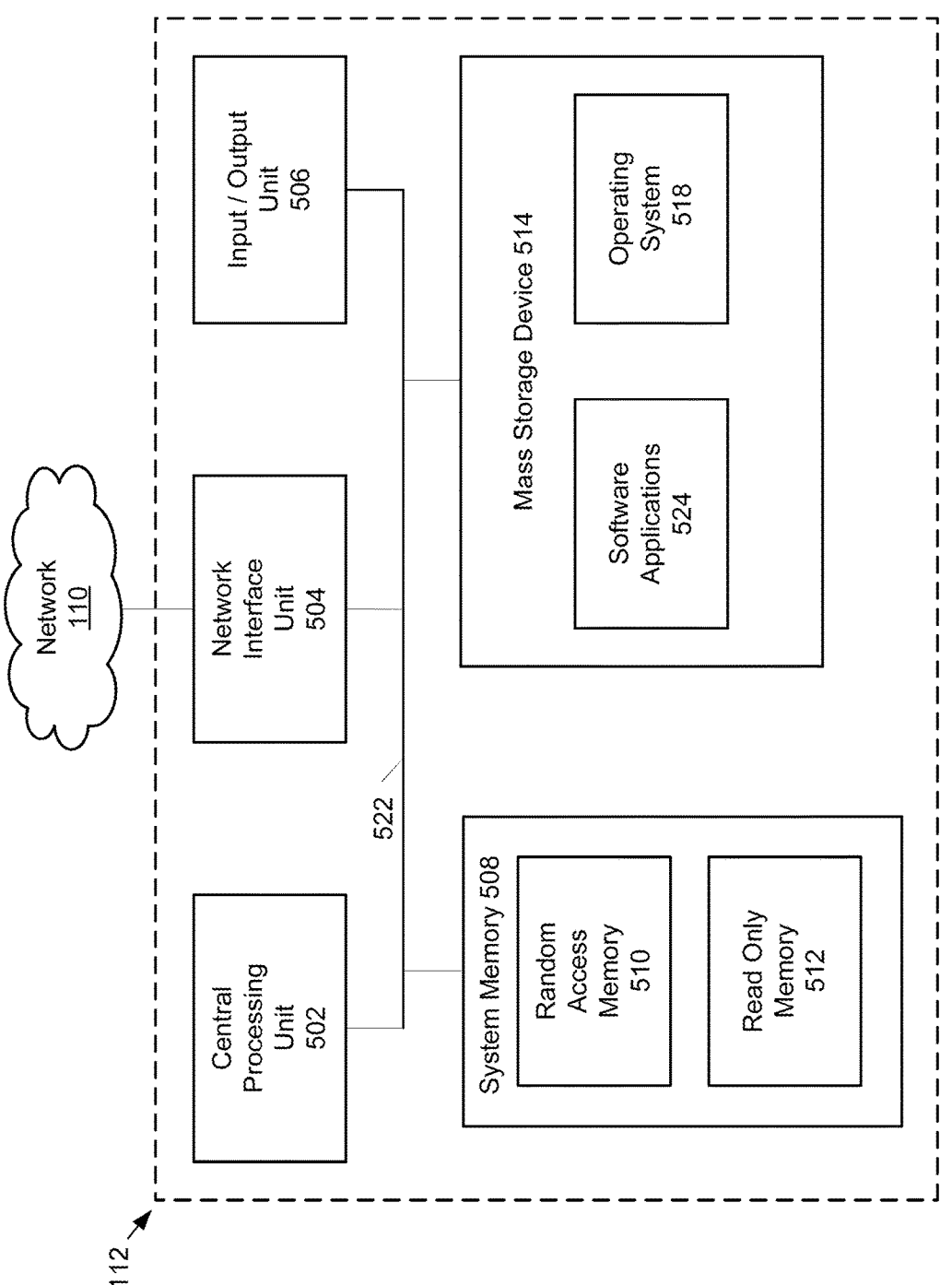
FIG. 5 shows example physical components of the server device of FIG. 2.

As illustrated FIG. 5, the example server device 112 which provides the functionality described herein can include at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system containing the basic routines that help transfer information between elements within the server device 112, such as during startup, is stored in the ROM 512. The server device 112 further includes a mass storage device 514. The mass storage device 514 can store software instructions and data. A central processing unit, system memory, and mass storage device similar to that shown can also be included in the other computing devices disclosed herein.

The mass storage device 514 is connected to the CPU 502 through a mass storage controller (not shown) connected to the system bus 522. The mass storage device 514 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 504 connected to the system bus 522. It should be appreciated that the network interface unit 504 may also be utilized to connect to other types of networks and remote computing systems. The server device 112 also includes an input/output controller 506 for receiving and processing input from a number of other devices, including a touch user interface display screen or another type of input device. Similarly, the input/output controller 506 may provide output to a touch user interface display screen or other output devices.

As mentioned briefly above, the mass storage device 514 and the RAM 510 of the server device 112 can store software instructions and data. The software instructions include an operating system 518 suitable for controlling the operation of the server device 112. The mass storage device 514 and/or the RAM 510 also store software instructions and applications 524, that when executed by the CPU 502, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for a rule engine service platform, comprising:

one or more processors; and non-transitory computer-readable storage media encoding instructions which, when executed by the one or more processors, cause the computer system to create:

a rule engine programmed to:

receive a business rule; and generate a decision model modeling the business rule using decision model and notation, including to:

implement the business rule as modular micro rules, wherein the micro rules represent a sub-element of the business rule, and wherein each of the micro rules comprises an independent decision model that is updateable through discrete components;

write the decision model to define decision logic that can be both modeled and executed by assigning semantics to decision model constructs to facilitate both decision modeling and execution of the decision model;

extract metadata associated with the decision model, wherein the metadata indicates whether the decision model is used in one or more active rules; and store the decision model in a rules database as byte chunks converted to an extensible markup language format for execution retrieval;

a decision service programmed to:

implement the decision model as a microservice that is independent of the rule engine, including to:

reside on a server device with the rule engine, wherein the decision service comprises code that is separate from code of the rule engine and accesses the rule engine to execute rules;

store the microservice on the server device separate from the rule engine, wherein the microservice is arranged as part of a collection of loosely-coupled services that communicate through lightweight protocols;

retrieve the decision model from the rules database in the extensible markup language format;

execute the decision model separately from other services in response to an application programming interface call from an application;

monitor execution of the decision model, including to:

execute the decision model in test scenarios;

compare expected results with actual results; and generate a report indicating pass or fail for the test scenarios; and deploy new versions of the decision model according to the metadata and without disrupting the other services, wherein the new versions are assigned version identifiers and stored in the rules database while older versions remain accessible based on credentials or time parameters, and wherein the new versions of the microservice are deployable as new microservices while the older versions of the microservice remain in service without interference, and wherein the older versions of the microservice are withdrawable without disrupting operations of the other services; and an administration and configuration service programmed to operate the rule engine.

2. The computer system of claim 1, wherein the decision model is written in Friendly Enough Expression Language.

3. The computer system of claim 1, wherein the administration and configuration service is further programmed to combine two or more of the micro rules to generate a new decision model.

* * * * *